No. 812,830. PATENTED FEB. 20, 1906.
H. E. DAHLMAN.
WEIGHING DEVICE.
APPLICATION FILED AUG. 28, 1905.

WITNESSES:
O. R. Erwin
Geo. R. Ford

INVENTOR
Henry E. Dahlman
BY
Erwin & Whaler
ATTORNEYS

UNITED STATES PATENT OFFICE.

HENRY E. DAHLMAN, OF BURLINGTON, WISCONSIN.

WEIGHING DEVICE.

No. 812,830.  Specification of Letters Patent.  Patented Feb. 20, 1906.

Application filed August 28, 1905. Serial No. 276,023.

*To all whom it may concern:*

Be it known that I, HENRY E. DAHLMAN, a citizen of the United States, residing at Burlington, county of Racine, and State of Wisconsin, have invented new and useful Improvements in Weighing Devices, of which the following is a specification.

My invention relates to improvements in weighing devices, and pertains especially to that class of such devices in which the article is weighed while being manually carried or supported, although the device may be also used for weighing articles of any description.

The object of the invention is to provide means whereby a handle used for carrying or supporting the article to be weighed will contain weighing apparatus and an index adapted to indicate the weight of the article carried in such a manner that it may be easily seen by the user.

The device is especially adapted for weighing the contents of pails and other receptacles, the use of which requires them to be manually transported from one place to another, the weight being ascertained by the user without delay.

In the following description reference is had to the accompanying drawings, in which—

Figure 1:
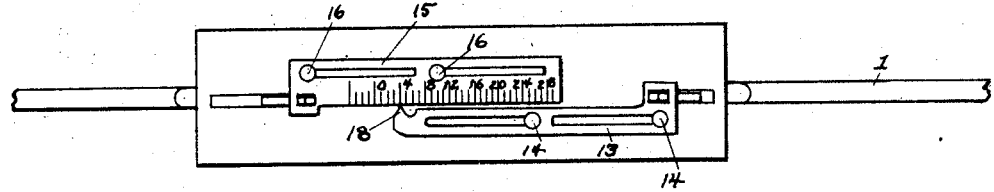
Figure 2:
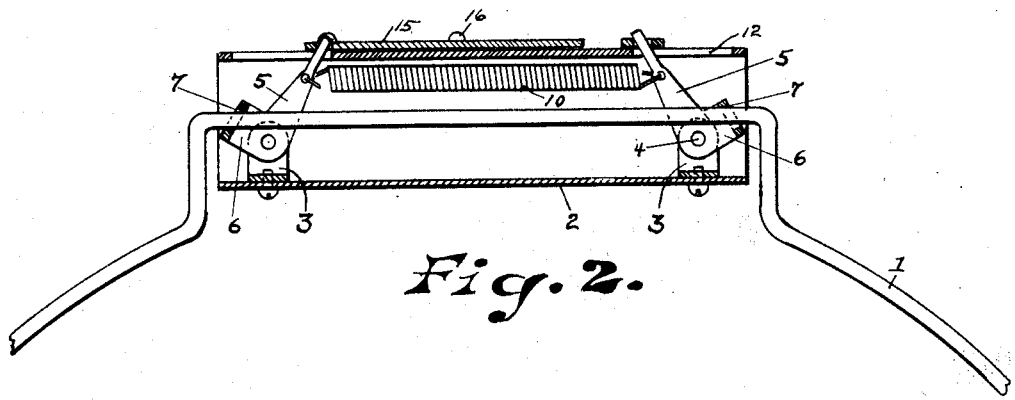
Figure 3:
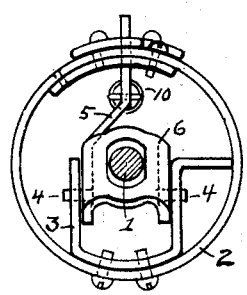
Figure 4:
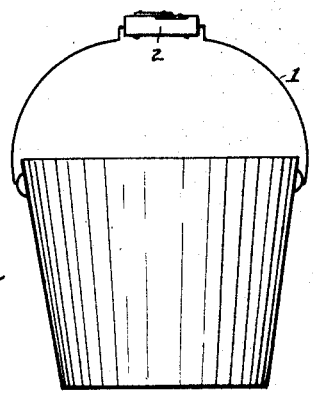

Figure 1 is a plan view of a pail-handle embodying my invention. Fig. 2 is a vertical sectional view of the same, showing the bail of the handle in position. Fig. 3 is an end view of the handle. Fig. 4 is a side view of a milk-pail embodying my invention.

Like parts are identified by the same reference characters throughout the several views.

A bail 1 extends through a cylindrical handle 2, within which suitable brackets 3 are mounted. Elbow-levers are pivotally secured at 4 to these brackets. Each of these elbow-levers is provided with an inwardly and upwardly projecting arm 5 and an outwardly and upwardly projecting arm 6, the latter being preferably in the form of a yoke, both ends of which are pivotally connected with the pins 4. The stirrup of the yoke is provided with an aperture 7, through which the bail 1 passes, whereby the downward pull on the bail tends to depress the arm 6 of the yoke, and thus causes the arm 5 to swing outwardly or toward the end of the handle. The two elbow-levers shown are pivoted to brackets 3 near the respective ends of the handle, and the arms 5 of the elbow-levers are connected by a spring 10. The arms 5 extend beyond the point of connection with the spring and upwardly through slots 12 in the handle. One of the arms is loosely connected with a slotted slide-bar 13, mounted on the exterior surface of the handle and guided by pins 14, which project through the slots in the bar 13. The arm 5 of the other elbow-lever is connected with an index-slide 15, having slots similar to those on the slide 13 and similarly held to the handle by means of pins 16. The slide 13 is provided with an index-pointer 18, which is arranged for relative travel along one margin of the index-slide 15.

With the described construction it is obvious that when any weight connected with the bail 1 is lifted by means of the handle 2 the arms 6 of the elbow-levers will be depressed, causing a corresponding outward movement of the arms 5 and a distention of the spring 10, the extent of the movement being indicated on the index-slide 15 by the pointer 18 on the slide 13. As both slides are free to move, it is immaterial whether the weight is balanced on the arms 6 of both elbow-levers or not, since it is not necessary that both slides should travel equally.

Having thus described my invention, what I claim as new, and desire to secure by Letters Patent, is—

1. A weighing device, comprising a casing provided with exterior index-slides; elbow-levers within the casing, each having one arm operatively connected with one of the index-slides; a weight-supporting bail extending through the casing and loosely connected with the other arms of the elbow-levers, and a tension device operatively connected with the elbow-levers and adapted to pull thereon in opposition to the pull of the bail.

2. In a device of the described class, the combination of a casing; an elbow-lever pivotally mounted therein; an index-slide normally mounted on the exterior surface of the casing and operatively connected with one arm of the elbow-lever; a bail connected with the other arm of said lever; and a tension device operatively connected with the lever to act in opposition to the pull exerted by the bail.

3. In a device of the described class, the combination of a casing; a set of elbow-levers pivotally mounted in the casing and provided with inwardly and upwardly projecting arms extended through slots in the casing; index-slides movably mounted on the exterior surface of the casing and operatively connected with said projecting arms; a spring connecting said arms within the casing; and a weight-supporting bail extending through said casing longitudinally and loosely connected with the other arms of the respective elbow-levers; said levers being positioned to receive a pull upon the bail in opposition to the tension of said spring.

In testimony whereof I affix my signature in the presence of two witnesses.

HENRY E. DAHLMAN.

Witnesses:
LEVERETT C. WHEELER,
CHAS. B. PERRY.